(12) United States Patent
Inoue

(10) Patent No.: US 11,025,730 B1
(45) Date of Patent: Jun. 1, 2021

(54) COMMUNICATION DEVICE AND NON-TRANSITORY COMPUTER-READABLE MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Takuya Inoue, Nisshin (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/104,121

(22) Filed: Nov. 25, 2020

(30) Foreign Application Priority Data

Nov. 29, 2019 (JP) .............................. JP2019-217164

(51) Int. Cl.
*H04L 29/08* (2006.01)

(52) U.S. Cl.
CPC ............ *H04L 67/141* (2013.01); *H04L 67/02* (2013.01); *H04L 67/145* (2013.01); *H04L 67/28* (2013.01)

(58) Field of Classification Search
CPC ..... H04L 67/02; H04L 67/141; H04L 67/145; H04L 67/28
See application file for complete search history.

(56) References Cited

U.S. PATENT DOCUMENTS

| | | | | |
|---|---|---|---|---|
| 2007/0294435 A1* | 12/2007 | Huang | ................... | H04L 47/746 709/251 |
| 2010/0262650 A1* | 10/2010 | Chauhan | ................ | H04L 67/26 709/203 |
| 2016/0286079 A1* | 9/2016 | Nishimura | ............ | H04L 67/141 |

FOREIGN PATENT DOCUMENTS

JP          2016-181877 A          10/2016

* cited by examiner

*Primary Examiner* — Gil H. Lee
(74) *Attorney, Agent, or Firm* — Scully, Scott, Murphy & Presser, PC

(57) ABSTRACT

A communication device may establish a session with a target server, execute a communication confirmation repeatedly, the communication confirmation including that the communication device sends a confirmation signal to the target server and receives a response signal from the target server, and adjust a waiting time. In a case where a proxy server is used in communication between the communication device and the target server, the communication device adjusts the waiting time by instructing the target server to use a first time as the waiting time. In a case where the proxy server is not used in communication between the communication device and the target server, the communication device adjusts the waiting time by instructing the target server to use a second time as the waiting time, the second time being longer than the first time.

8 Claims, 8 Drawing Sheets

COMMUNICATION DEVICE AND NON-TRANSITORY COMPUTER-READABLE MEDIUM STORING COMPUTER-READABLE INSTRUCTIONS FOR COMMUNICATION DEVICE

CROSS-REFERENCE TO RELATED APPLICATION

This application claims priority to Japanese Patent Application No. 2019-217164 filed on Nov. 29, 2019, the contents of which are hereby incorporated by reference into the present application.

TECHNICAL FIELD

The disclosure herein discloses art related to a communication device configured to establish a session with a server.

DESCRIPTION OF RELATED ART

An MFP configured to establish a session with a server is known. The MFP periodically sends a packet to the server after the session has been established. In a case where the session is maintained, the MFP receives a response to the packet from the server. The MFP adjusts a time interval for sending the packet to a time interval within a session timeout period defined by a firewall function of a router.

SUMMARY

A proxy server may intermediate between an MFP and a server. The technique described above does not give any consideration to a proxy server.

The disclosure herein provides art for suitably executing a communication confirmation with a target server with consideration given to whether a proxy server is present or not.

A communication device disclosed herein may comprise: a communication interface; and a controller. The controller may be configured to: establish a session according to Hypertext Transfer Protocol (HTTP) with a target server on the Internet via the communication interface; execute a communication confirmation repeatedly via the communication interface after the session has been established, the communication confirmation including that the communication device sends a confirmation signal to the target server and receives a response signal from the target server; and adjust a waiting time, the waiting time being a time period from when the target server received the confirmation signal from the communication device to when the target server sends the response signal to the communication device, in a case where a proxy server is used in communication between the communication device and the target server, the controller adjusts the waiting time by instructing the target server to use a first time as the waiting time, and in a case where the proxy server is not used in communication between the communication device and the target server, the controller adjusts the waiting time by instructing the target server to use a second time as the waiting time, the second time being longer than the first time.

A control method implemented by the communication device, a computer program for the communication device, and a non-transitory computer-readable medium storing computer-readable instructions for the communication device are also novel and useful.

EMBODIMENTS

First Embodiment

Figure 1:
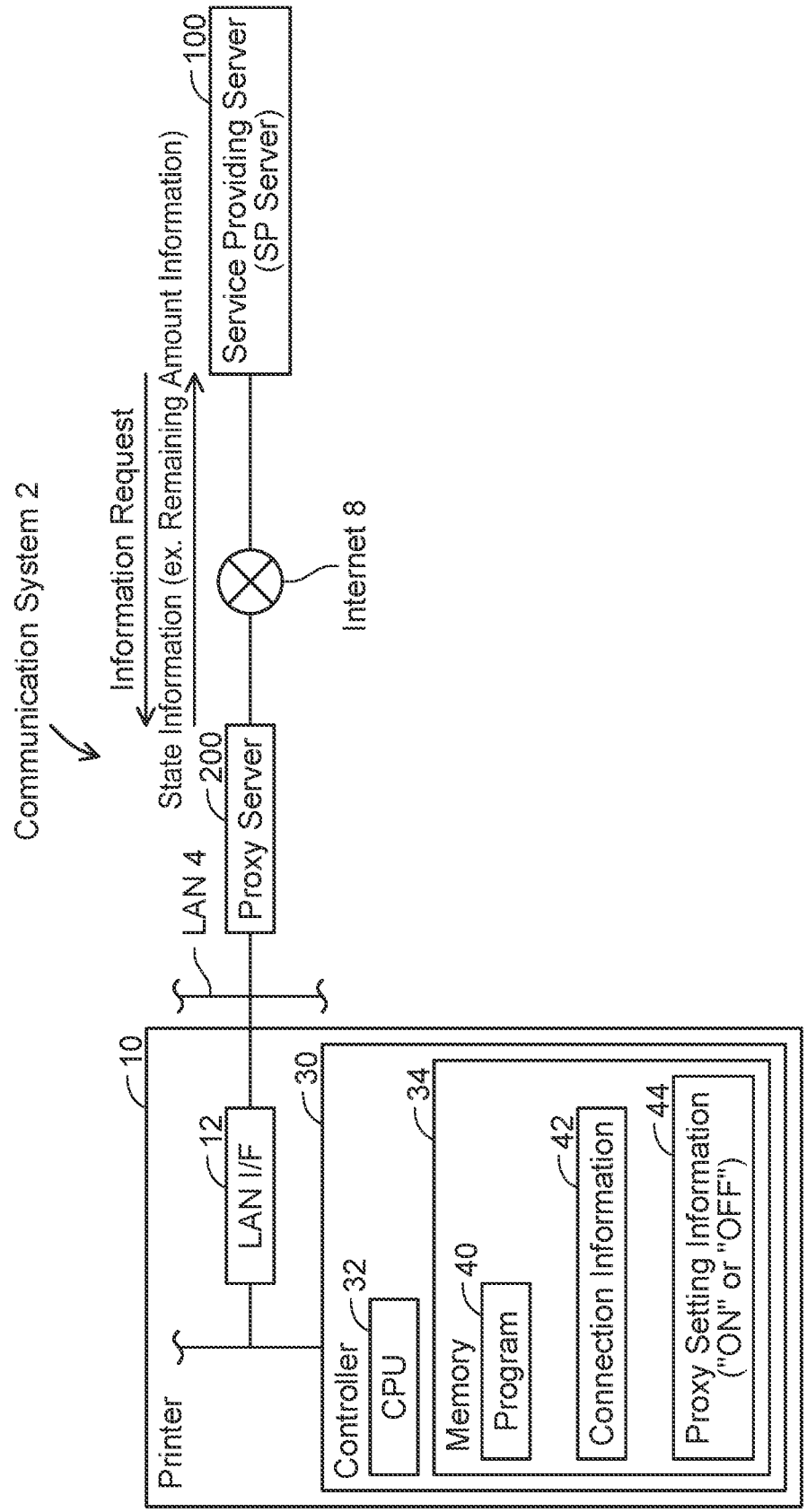
FIG. 1 shows a configuration of a communication system.

Configuration of Communication System 2; FIG. 1

As shown in FIG. 1, a communication system 2 includes a printer 10, a service providing server 100, and a proxy server 200. Hereinbelow, the service providing server will be termed "SP server".

The printer 10 and the proxy server 200 are connected to a Local Area Network (LAN) 4. The proxy server 200 is connected to the Internet 8. The SP server 100 is also connected to the Internet 8. The printer 10 is capable of communicating with the SP server 100 through the proxy server 200 and the Internet 8.

The proxy server 200 is installed on the LAN 4 by an administrator of the LAN 4. The proxy server 200 is configured to intermediate communication between devices belonging to the LAN 4 (e.g., the printer 10) and the Internet 8. The printer 10 is capable of communicating with a device on the Internet 8 (e.g., the SP server 100), for example, by using a simple router instead of using the proxy server 200. Advantages of using the proxy server 200 are as follows. For example, when a device on the internet 8 is communicating with a device on the LAN 4 (e.g., the printer 10) via the proxy server 200, the device on the Internet 8 cannot identify which one of devices on the LAN 4 it is communicating with. As such, anonymity of the device on the LAN 4 is ensured in a perspective from the device on the Internet 8. Further, the proxy server 200 caches information related to the Internet 8, which enables high-speed communication when the devices on the LAN 4 execute communication through the Internet 8.

The SP server 100 is a server for providing a service related to the printer 10 to a user of the printer 10. To provide the service to the user, the SP server 100 is configured to send, to the printer 10, an information request for requesting state information indicating an operating state of the printer 10 and receive the state information from the printer 10 by using an HTTP session to be described later. Further, the SP server 100 is configured to execute a process for providing the service by using the received state information. The service may, for example, be a shipping service of shipping a cartridge. In this case, the state information includes remaining amount information indicating a remaining amount in an ink cartridge in the printer 10. For example, in a case of determining that the remaining amount indicated by the remaining amount information received from the printer 10 is equal to or less than a predetermined threshold, the SP server 100 may execute a shipping process (e.g., notification to a worker) for shipping a new cartridge to be attached to the printer 10. In another example, the service may be a service of leasing the printer 10 to the user with charges calculated based on usage of the printer 10 (e.g., the number of printed sheets), a service of providing maintenance of the printer 10 to the user, a service of providing email print which is printing that uses an email, or the like. Here, in case of the email print, when receiving an email including image data from outside, the SP server 100 sends a notification indicating that the email has been received to the printer 10 by using the HTTP session to be described later. Then, in a case of receiving a response to the notification from the printer 10, the SP server 100 sends the image data in the email to the printer 10. The printer 10 then executes printing according to the image data, and the email print is thereby realized.

(Configuration of Printer 10)

The printer 10 is a device with a print function. The printer 10 includes a LAN interface 12 and a controller 30. The respective units 12 and 30 are connected to a bus line (reference sign omitted). Hereinbelow, an interface will be denoted "I/F". The LAN I/F 12 is an I/F for executing communication through the LAN 4 and is connected to the LAN 4. The controller 30 includes a CPU 32 and a memory 34. The CPU 32 is configured to execute various processes according to a program 40 stored in the memory 34. The memory 34 is configured of a volatile memory, a nonvolatile memory, and the like. The memory 34 further stores connection information 42 and proxy setting information 44.

The connection information 42 is information for establishing an HTTP session according to Hypertext Transfer Protocol (HTTP) between the SP server 100 on the Internet 8 and the printer 10. The HTTP session is a session that enables so-called full-time communication. Once established, the HTTP session is maintained until the printer 10 is turned off. By using the HTTP session, the SP server 100 can send a request (e.g., the information request mentioned above) to the printer 10 over the firewall of the LAN 4 to which the printer 10 belongs, without receiving a request from the printer 10. The HTTP session may, for example, be a session according to an eXtensible Messaging and Presence Protocol (XMPP) over Bidirectional-streams Over Synchronous HTTP (BOSH). The HTTP session is not limited to the session according to the XMPP over BOSH, but may be a session according to another protocol complying with the HTTP (e.g., WebSocket).

The connection information 42 includes authentication information (e.g., an access token) for authenticating the printer 10. The connection information 42 is created by the SP server 100. For example, when an instruction for starting the service is inputted to the printer 10, the connection information 42 is sent from the SP server 100 to the printer 10 and is stored in the memory 34 of the printer 10. Then, the printer 10 executes communication with the SP server 100 by using the connection information 42 in the memory 34. As a result, the printer 10 is authenticated by the SP server 100, and an HTTP session is established between the printer 10 and the SP server 100.

The proxy setting information 44 indicates one of a value "ON" indicating that the proxy server 200 is to be used and a value "OFF" indicating that the proxy server 200 is not to be used. The proxy setting information 44 indicates "OFF" by default. The proxy setting information 44 is inputted by the user. For example, in a case where "ON" is inputted as the proxy setting information 44, an address of the proxy server 200 and a port number to be used for communication with the proxy server 200 are inputted.

Figure 2:
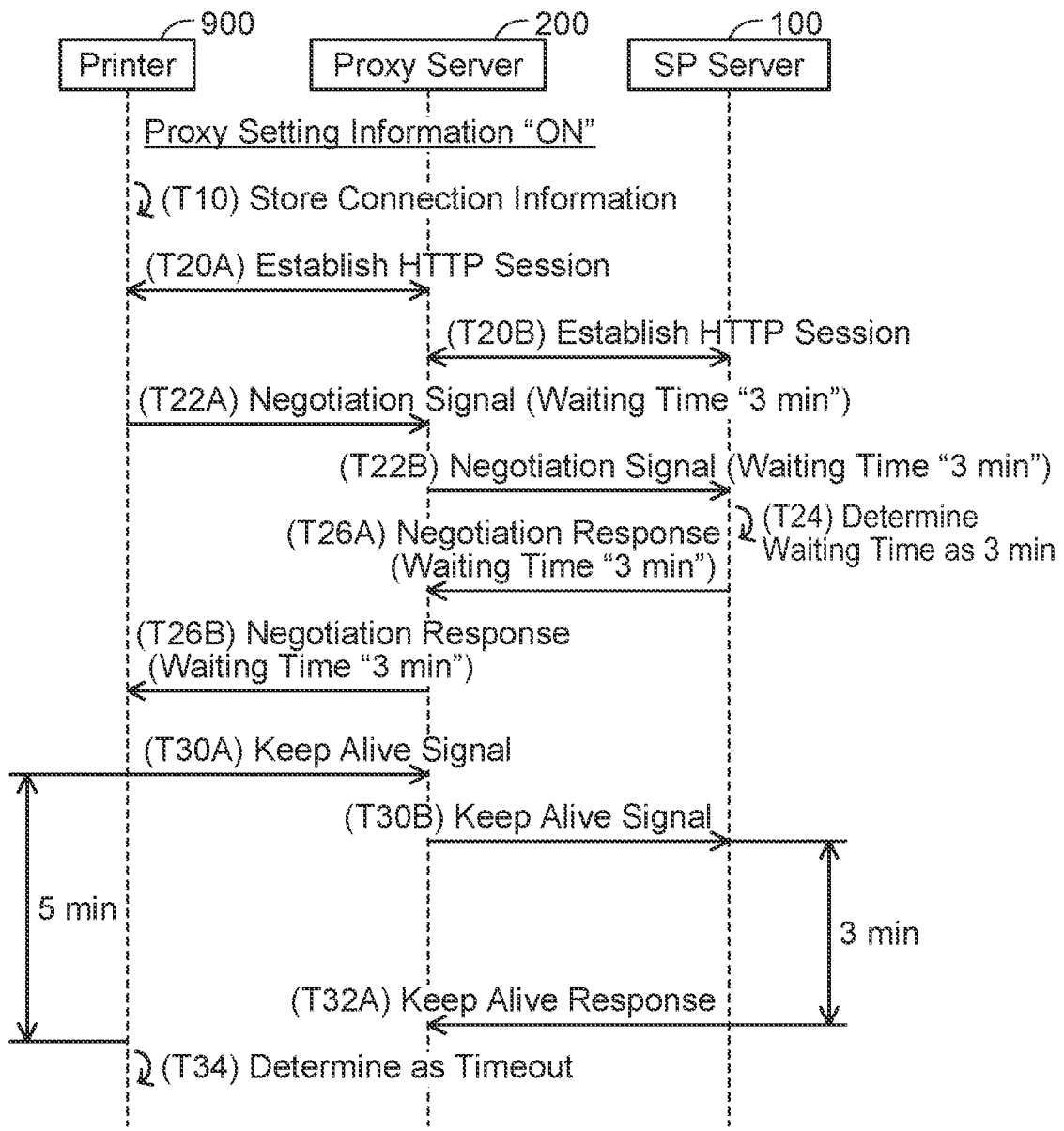
FIG. 2 shows a sequence diagram of a process according to a comparative example.

Comparative Example; FIG. 2

Before explanation of processes according to the embodiment, a process according to a comparative example will be described with reference to FIG. 2. A printer 900 of the comparative example is similar to the printer 10 of the embodiment except that a program different from the program 40 is stored in its memory 34. In an initial state of FIG. 2, the proxy setting information 44 of the printer 900 indicates "ON".

In a case where an instruction for starting the service is inputted in the printer 900, the printer 900 receives the connection information 42 (e.g., an access token) from the SP server 100 and stores this connection information 42 in the memory 34 in T10. It should be noted that if the printer 900 is to be establish an HTTP session again after an HTTP session in T20A, T20B described later has established and this HTTP session has disconnected, the printer 900 establishes the HTTP session by using the connection information 42 in the memory 34 without receiving the connection information 42 again from the SP server 100.

In T20A and T20B, the printer 900 establishes an HTTP session with the SP server 100 via the proxy server 200 by using the connection information 42 in the memory 34. Specifically, an HTTP session is established between the printer 900 and the proxy server 200 and an HTTP session is also established between the proxy server 200 and the SP server 100. Through the HTTP session, a communication confirmation for checking on presence of a communication disturbance is repeatedly executed. The communication confirmation includes one of the devices (e.g., printer 900) on the HTTP session sending a Keep Alive signal to the other device (e.g., the SP server 100) on the HTTP session and the one of the devices receiving a response to the Keep Alive signal (hereinbelow termed "Keep Alive response") from the other device. For example, in the printer 900, a timeout period (e.g., "5 minutes") is set for communication according to Transmission Control Protocol (TCP). Here, "timeout" is a so-called TCP timeout. The TCP timeout period is a duration of time during which establishment of a session according to the TCP can be maintained. In general, in a case where a session according to the TCP has been established but the TCP timeout period elapses from when the session was established without one of the devices receiving any signal from the other of the devices, this session is disconnected. In a case where the Keep Alive response is received before the timeout period elapses from when the Keep Alive signal was sent, it is determined that no communication disturbance is occurring and the communication confirmation succeeds. On the other hand, in a case where the Keep Alive response is not received before the timeout period elapses from when the Keep Alive signal was sent, it is determined that a communication disturbance is occurring and the communication confirmation fails. In the case where the communication confirmation fails, the HTTP session is disconnected. When the HTTP session is disconnected, the printer 900 attempts to establish an HTTP session again with the SP server 100.

In an HTTP session, Negotiation is executed. The Negotiation is for adjusting a waiting time that is a time period from when one of devices, which is a recipient of a Keep Alive signal, received a Keep Alive signal to when this one device sends a Keep Alive response. The Negotiation includes the other of the devices, which is a sender of the Keep Alive signal, instructing the one device to use a certain waiting time.

In this comparative example, after having established the HTTP session with the SP server 100 in T20A and T20B, the printer 900 executes Negotiation with the SP server 100 in T22A to T26B. This Negotiation includes the printer 900 instructing the SP server 100 to use a waiting time "3 minutes". Specifically, the printer 900 sends a Negotiation signal including the waiting time "3 minutes" to the proxy server 200 in T22A, and then the proxy server 200 sends this Negotiation signal to the SP server 100 in T22B. The Negotiation signal is a signal for instructing the SP server 100 to use a certain waiting time. In T24, the SP server 100 determines the waiting time as "3 minutes" according to the Negotiation signal. Then, the SP server 100 sends a Negotiation response including the determined waiting time "3 minutes" to the proxy server 200 in T26A, and then the proxy server 200 sends this Negotiation response to the printer 900 in T26B. The Negotiation response is a response to the Negotiation signal.

After having executed the Negotiation with the SP server 100, the printer 900 starts sending a Keep Alive signal to the SP server 100. Since the proxy setting information 44 of the printer 900 indicates "ON" in this comparative example, the printer 900 sends the Keep Alive signal to the proxy server 200 via the LAN 4 in T30A.

When receiving the Keep Alive signal from the printer 900 in T30A, the proxy server 200 sends the Keep Alive signal to the SP server 100 in T30B.

The SP server 100 receives the Keep Alive signal from the proxy server 200 in T30B via the Internet 8. Then, after the waiting time "3 minutes" has elapsed from the receipt of the Keep Alive signal, the SP server 100 sends a Keep Alive response to the proxy server 200 via the Internet 8 in T32A.

As described above, the proxy server 200 has various functions as compared to a simple router. Therefore, due to an influence of processing time in the proxy server 200, it is highly possible that a timing when the SP server 100 receives a Keep Alive signal with use of the proxy server 200 is delayed as compared to a timing when the SP server 100 receives a Keep Alive signal without use of the proxy server 200. In the present comparative example, the timing of T32A when the proxy server 200 receives the Keep Alive response from the SP server 100 is within a lapse of a timeout period "5 minutes" from when the printer 900 sent the Keep Alive signal in T30A. However, as a result of the delay in the Keep Alive signal, the proxy server 200 cannot send the Keep Alive response to the printer 900 before the timeout period "5 minutes" elapses. Due to this, the communication confirmation fails. As a result, the HTTP session is disconnected.

In the case where the proxy server 200 is used as above, a Keep Alive signal or a Keep Alive response could be delayed. In such a case, the communication confirmation fails due to the timeout period having elapsed, despite no communication disturbance occurring between the printer 900 and the SP server 100. That is, the HTTP session could be unnecessarily disconnected, despite no communication disturbance occurring. Meanwhile, the present embodiment realizes suitable execution of the communication confirmation with consideration given to whether the proxy server 200 intermediates or not (i.e., whether the proxy server 200 is used or not) between the devices on an HTTP session.

Figure 3:
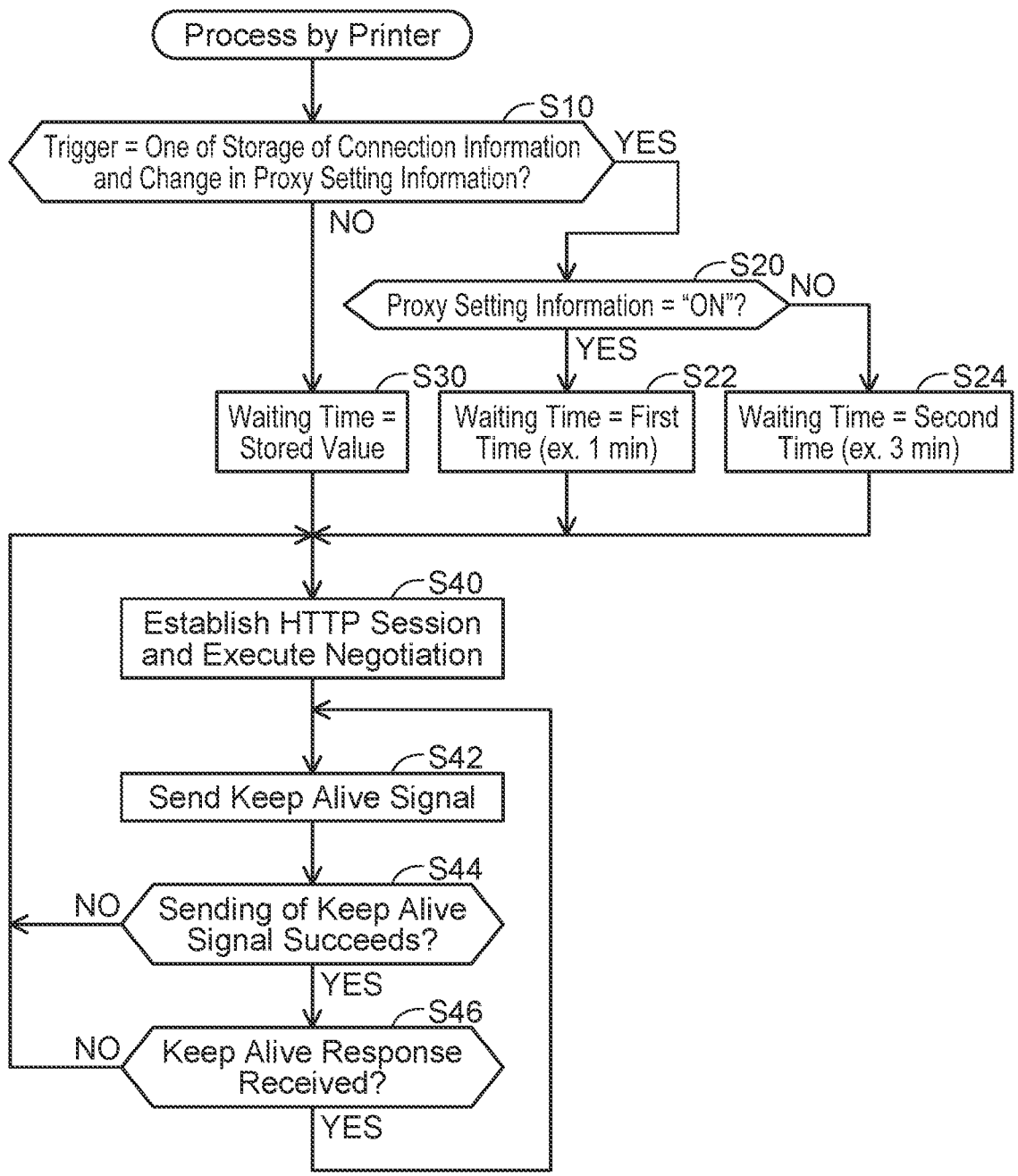
FIG. 3 shows a flowchart of a process executed by a printer according to a first embodiment.

Process by Printer; FIG. 3

A process executed by the printer 10 of the present embodiment will be described with reference to FIG. 3. The process of FIG. 3 is initiated with one of the following as a trigger: the printer 10 storing the connection information 42 in the memory 34 (i.e., the instruction for starting the service is inputted); the printer 10 being turned on with the connection information 42 stored in the memory 34; and an operation of changing the proxy setting information 44 being performed by the user. The process of FIG. 3 is terminated when the printer 10 is turned off.

In S10, the CPU 32 determines whether the trigger of the process of FIG. 3 is a specific trigger. Here, the specific trigger is one of the printer 10 storing the connection information 42 in the memory 34 and the operation of changing the proxy setting information 44 being performed by the user. In a case of determining that the trigger of the process of FIG. 3 is the specific trigger (YES in S10), the CPU 32 proceeds to S20.

In S20, the CPU 32 determines whether the current proxy setting information 44 is "ON". In a case of determining that the current proxy setting information 44 is "ON" (YES in S20), the CPU 32 determines in S22 that the SP server 100 is to be instructed to use a first time (e.g., "1 minute") as the waiting time to in Negotiation. Then, the CPU 32 stores the first time in the memory 34 as a stored value of S30 (to be described later).

In a case of determining that the current proxy setting information 44 is "OFF" (NO in S20), the CPU 32 determines in S24 that the SP server 100 is to be instructed to use a second time (e.g., "3 minutes"), which is longer than the aforementioned first time, as the waiting time. Then, the CPU 32 stores the second time in the memory 34 as a stored value of S30 (to be described later).

In a case where the trigger of the process of FIG. 3 is not the specific trigger, that is, in a case where the CPU 32 determines that the trigger of FIG. 3 is the printer 10 being turned on with the connection information 42 stored in the memory 34 (NO in S10), the CPU 32 determines the stored value as the waiting time in S30. When any one of the processes of S22, S24, and S30 is completed, a process of S40 is executed.

In S40, the CPU 32 establishes an HTTP session with the SP server 100 via the LAN I/F 12 by using the connection information 42 in the memory 34, and then the CPU 32 executes Negotiation with the SP server 100. This Negotiation includes instructing the SP server 100 to use the waiting time determined by one of the processes of S22, S24, and S30.

In S42, the CPU 32 sends a Keep Alive signal to the SP server 100 via the LAN I/F 12.

In S44, the CPU 32 determines whether the sending of the Keep Alive signal succeeded. For example, in a case where the CPU 32 can receive a receipt notification indicating that the Keep Alive signal was received from an intermediating device (e.g., the proxy server 200, a simple router, etc.) that intermediates communication between the LAN 4 and the Internet 8, the CPU 32 determines that the sending of the Keep Alive signal succeeded. On the other hand, in a case where the CPU 32 cannot receive the receipt notification from the intermediating device, for example, due to the intermediating device being off, the CPU 32 determines that the sending of the Keep Alive signal failed. The CPU 32 proceeds to S46 in a case of determining that the sending of the Keep Alive signal succeeded (YES in S44), while the CPU 32 returns to S40 in a case of determining that sending of the Keep Alive signal failed (NO in S44). In the case where the sending of the Keep Alive signal failed, the HTTP session was disconnected due to the intermediating device being off, thus the CPU 32 attempts to establish an HTTP session again in S40.

In S46, the CPU 32 determines whether a Keep Alive response to the Keep Alive signal of S42 is received from the SP server 100 via the LAN I/F 12. For example, in a case of receiving a Keep Alive response from the SP server 100 before a timeout period (e.g., "5 minutes") elapses from the sending of the Keep Alive signal in S42, the CPU 32 determines YES in S46 and proceeds to S42, and sends a Keep Alive signal again to the SP server 100. On the other hand, in a case of not receiving a Keep Alive response from the SP server 100 (e.g., in a case where the timeout period has elapsed from the sending of the Keep Alive signal in S42 without a Keep Alive response being received from the SP server 100 or in a case where a signal different from a Keep Alive response is received from the SP server 100 before the timeout period elapses), the CPU 32 determines NO in S46 and returns to S40. In the case of NO in S46, the HTTP session is disconnected due to the failure of the communication confirmation, thus the CPU 32 attempts to establish an HTTP session again in S40.

Figure 4:
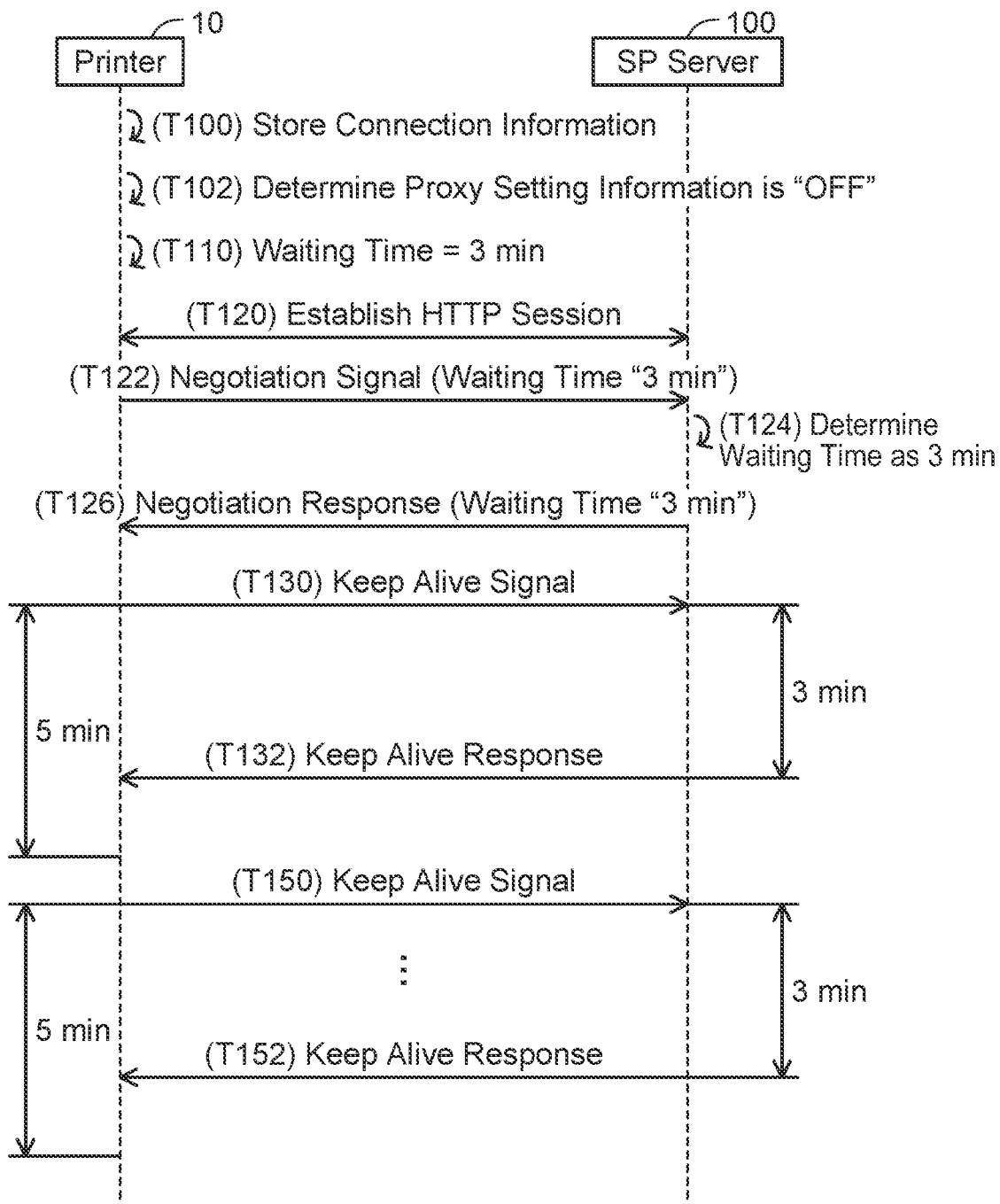
FIG. 4 shows Case A1 in which a proxy server is not used.

Case A1 in which Proxy Server is Not Used; FIG. 4

A specific Case A1 realized by the process of FIG. 3 will be described with reference to FIG. 4. In Case A1, the proxy server is not used. In an initial state of FIG. 4, the proxy setting information 44 indicates "OFF". Hereinbelow, for easier understanding, processes executed by CPUs of respective devices (e.g., the CPU 32 of the printer 10) will be described with the respective devices (e.g., the printer 10) as the subject of action instead of describing the processes with the CPUs as the subject of action. Further, hereinbelow, communication executed between the printer 10 and the SP server 100 is via the LAN 4 and the Internet 8. Thus, the phrases "via the LAN 4" and "via the Internet 8" will be omitted unless otherwise mentioned.

When the instruction to start the service is inputted, the printer 10 receives the connection information 42 form the SP server 100 and stores this connection information 42 in the memory 34 in T100 (YES in S10 of FIG. 3).

In T102, the printer 10 determines that the current proxy setting information 44 is "OFF" (NO in S20). Then, in T110, the printer 10 determines the second time "3 minutes" as the waiting time (S24).

In T120, the printer 10 establishes an HTTP session with the SP server 100 by using the connection information 42 in the memory 34 (S40).

In T122, the printer 10 sends a Negotiation signal including the waiting time "3 minutes" to the SP server 100 (S40). Due to this, the SP server 100 determines the waiting time as "3 minutes" according to the Negotiation signal in T124. Then, the SP server 100 sends a Negotiation response including the determined waiting time "3 minutes" to the printer 10 in T126.

Next, the printer 10 sends a Keep Alive signal to the SP server 100 in T130 (S42). In the present case, an intermediating device (e.g., a simple router, not shown) between the printer 10 and the SP server 100 operates normally. Thus, the Keep Alive signal is successfully sent (YES in S44), and the SP server 100 receives the Keep Alive signal from the printer 10 in T130.

After the waiting time "3 minutes" has elapsed from the receipt of the Keep Alive signal, the SP server 100 sends a Keep Alive response to the printer 10 in T132. Since the simple router, for example, is used but the proxy server 200 is not used in the present case, the Keep Alive signal or the Keep Alive response is less likely to be delayed. Therefore, the printer 10 receives the Keep Alive response from the SP server 100 before the timeout period of "5 minutes" elapses.

The printer 10 determines in T132 that the Keep Alive response is received from the SP server 100 (YES in S46) and sends a Keep Alive signal again to the SP server 100 in T150. T152 is similar to T132. That is, the printer 10 repeatedly executes the communication confirmation and each communication confirmation succeeds.

In the present case in which the proxy server 200 is not used, the waiting time is adjusted to the second time "3 minutes", which is relatively long. The Keep Alive signals or the Keep Alive responses are less likely to be delayed in the case where the proxy server 200 is not used, as compared to a case in which the proxy server 200 is used. By adjusting the waiting time to a longer time, the number of times the communication confirmation is executed within a predetermined time period (e.g., one day) can be reduced.

Figure 5:
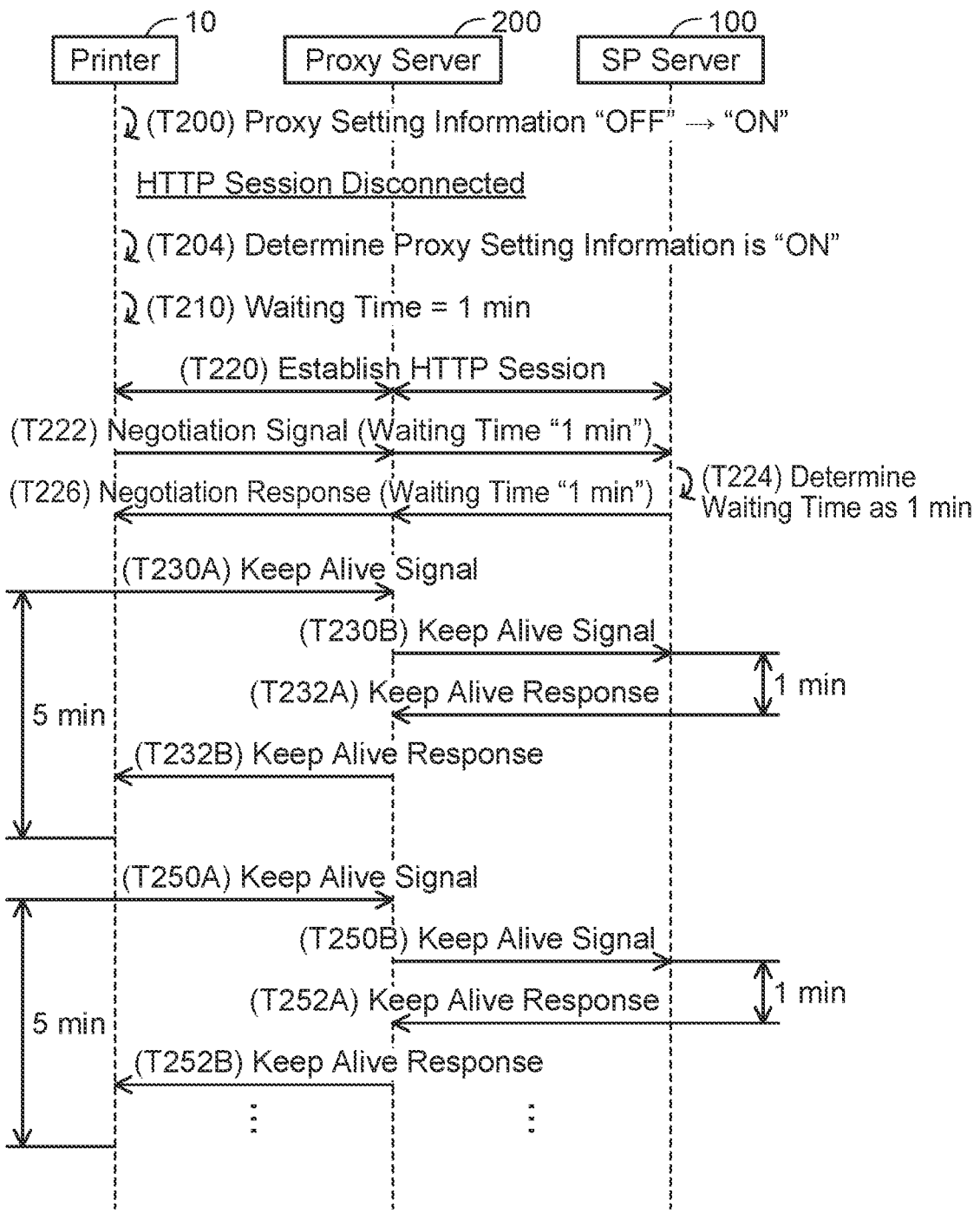
FIG. 5 shows Case A2 in which a proxy server is used.

Case A2 in which Proxy Server is Used; FIG. 5

A specific Case A2 realized by the process of FIG. 3 will be described with reference to FIG. 5. In Case A2, the proxy server is used. Case A2 is a continuation of Case A1.

In T200, the printer 10 changes the proxy setting information 44 from "OFF" to "ON" in response to the operation of changing the proxy setting information 44 being performed by the user. Here, when the proxy setting information 44 is changed, the HTTP session is disconnected.

In T204, the printer 10 determines that the current proxy setting information 44 is "ON" (YES in S20). Then, in T210, the printer 10 determines the first time of "1 minute" as the waiting time (S22).

In T220, the printer 10 establishes an HTTP session again with the SP server 100 via the proxy server 200 by using the connection information 42 in the memory 34 (S40).

In T222, the printer 10 sends a Negotiation signal including the waiting time "1 minute" to the SP server 100 via the proxy server 200 (S40). Due to this, the SP server 100 determines the waiting time as "1 minute" according to the Negotiation signal in T224. Then, the SP server 100 sends a Negotiation response including the determined waiting time "1 minute" to the printer 10 via the proxy server 200 in T226.

Next, in T230A, the printer 10 sends a Keep Alive signal to the proxy server 200. Due to this, the proxy server 200 sends the Keep Alive signal to the SP server 100 in T230B.

In T230B, the SP server 100 receives the Keep Alive signal from the proxy server 200. Then, after the waiting time "1 minute" has elapsed from the receipt of the Keep Alive signal, the SP server 100 sends a Keep Alive response to the proxy server 200 via the Internet 8 in T232A.

The waiting time "1 minute" in the present case is shorter than the waiting time "3 minutes" in the comparative example of FIG. 2. Thus, in T232A, the proxy server 200 receives the Keep Alive response from the SP server 100 before the timeout period "5 minutes" elapses, and then the printer 10 receives in T232B the Keep Alive response from the proxy server 200 before the timeout period "5 minutes" elapses. That is, the communication confirmation succeeds.

The printer 10 determines that the Keep Alive response is received from the SP server 100 in T232B (YES in S46), and sends a Keep Alive signal again to the proxy server 200 in T250A. T250B to T252B are similar to T230B to T232B.

That is, the printer 10 repeatedly executes the communication confirmation and each communication confirmation succeeds.

In the present case in which the proxy server 200 is used, the waiting time is adjusted to the first time of "1 minute", which is relatively short. As described in the comparative example of FIG. 2, it is highly possible that Keep Alive signal or Keep Alive response is delayed in the case where the proxy server 200 is used. However, as explained in the present embodiment, adjusting the waiting time to a shorter time can suppress the failure of the communication confirmation caused by the delay in Keep Alive signal or Keep Alive response.

Effects of Present Embodiment

According to the configuration of the present embodiment, the printer 10 determines the waiting time as the relatively-short first time of "1 minute" (S22) in the case where the proxy server 200 is used (YES in S20 of FIG. 3), while it determines the waiting time as the relatively-long second time of "3 minutes" (S24) in the case where the proxy server 200 is not used (NO in S20). That is, the communication confirmation can suitably be executed based on whether the proxy server 200 is used or not.

Also in the case where the operation of changing the proxy setting information 44 is performed by the user (YES in S10), the printer 10 adjusts the waiting time in accordance with the changed proxy setting information 44 (S22 or S24). For example, a comparative example is assumed here in which despite the proxy setting information 44 being changed, the waiting time according to the pre-change proxy setting information 44 is maintained. In this comparative example, the waiting time is maintained at a relatively long waiting time (e.g., "3 minutes") even though the proxy setting information 44 has been changed to "ON", as a result of which the communication confirmation may fail as in FIG. 2. Moreover, in this comparative example, the waiting time is maintained at a relatively short waiting time (e.g., "1 minute") even though the proxy setting information 44 has been changed to "OFF", as a result of which the number of times the communication confirmation is executed within a predetermined period (e.g., one day) may unnecessarily increase. Contrary to this, the present embodiment enables suitable execution of the communication confirmation even though the proxy setting information 44 is changed.

(Corresponding Relationships)

The printer 10 and the LAN I/F 12 are respectively examples of "communication device" and "communication interface". The proxy server 200 is an example of "proxy server". The SP server 100 is an example of "target server". The HTTP session according to the XMPP over BOSH is an example of "session". The Keep Alive signals and the Keep Alive responses are respectively examples of "confirmation signal" and "response signal". The first time "1 minute" in S22 and the second time "3 minutes" in S24 are respectively examples of "first time" and "second time".

S42 to S46 of FIG. 3 are an example of "execute a communication confirmation". Establishing the HTTP session in S40 and executing the Negotiation in S40 are respectively examples of "establish a session" and "adjust a waiting time".

Second Embodiment

Figure 6:
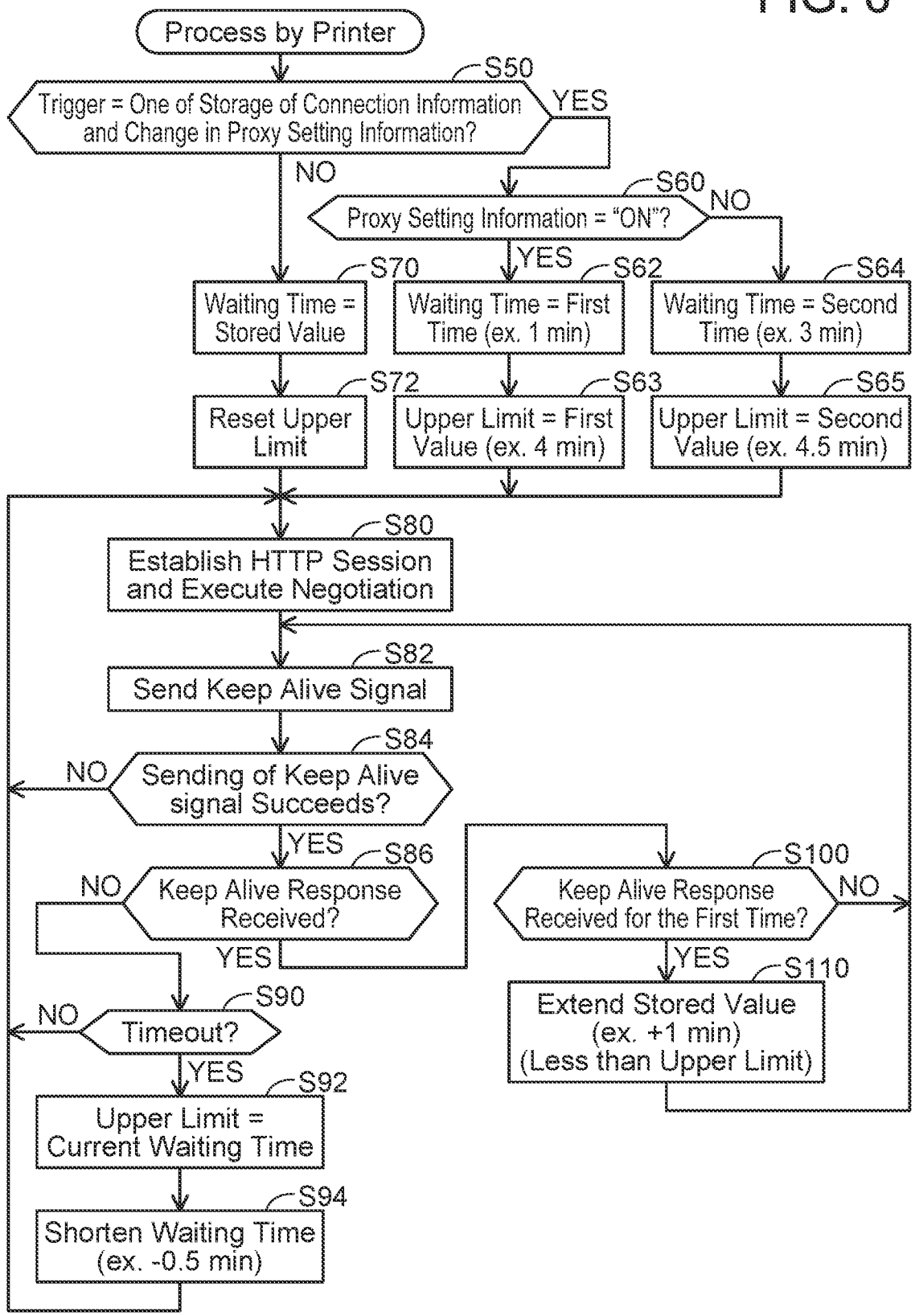
FIG. 6 shows a flowchart of a process executed by the printer according to a second embodiment.

Process by Printer; FIG. 6

The present embodiment is similar to the first embodiment except that a process of extending or shortening a waiting time is added in the process by the printer 10.

S50 and S60 are similar to S10 and S20 of FIG. 3. The CPU 32 executes processes of S62 and S63 in a case of determining that the current proxy setting information 44 is "ON" (YES in S60). S62 is similar to S22 of FIG. 3. In S63, the CPU 32 determines a first value (e.g., "4 minutes") as an upper limit of an adoptable waiting time. Then, the CPU 32 stores the determined upper limit in the memory 34. Here, the upper limit is a time shorter than the TCP timeout period.

On the other hand, the CPU 32 executes processes of S64 and S65 in a case of determining that the current proxy setting information 44 is "OFF" (NO in S60). S64 is similar to S24 of FIG. 3. In S65, the CPU 32 determines a second value (e.g., "4.5 minutes"), which is larger than the first value, as an upper limit of an adoptable waiting time. Then, the CPU 32 stores the determined upper limit in the memory 34. By setting the upper limit at a relatively long time in the case where the proxy setting information 44 is "OFF", that is, in the case where the proxy server 200 is not used, the number of times the communication confirmation is executed within a predetermined period (e.g., one day) can be reduced as much as possible. In a variant, the CPU 32 may further determine a third value (e.g., "5 minutes") as a timeout period in the case of determining that the current proxy setting information 44 is "ON" (YES in S60), while it may further determine a fourth value (e.g., "6 minutes"), which is larger than the third value, as a timeout period in the case of determining that the current proxy setting information 44 is "OFF" (NO in S60).

In a case of determining that the trigger of the process of FIG. 6 is the printer 10 being turned on with the connection information 42 stored in the memory 34 (NO in S50), the CPU 32 proceeds to S70 and S72. S70 is similar to S30 of FIG. 3. In S72, the CPU 32 resets a new upper limit determined in S92 (to be described later). Specifically, the CPU 32 determines the first value as the upper limit (see S63) in the case where the proxy setting information 44 is "ON", while it determines the second value as the upper limit (see S65) in the case where the proxy setting information 44 is "OFF". When any one of the processes of S63, S65, and S72 is completed, a process of S80 is executed.

S80 to S86 are similar to S40 to S46 of FIG. 3. In a case of determining that a Keep Alive response is not received from the SP server 100 (NO in S86), the CPU 32 proceeds to S90.

In S90, the CPU 32 determines whether the determination of S86 that a Keep Alive response is not received from the SP server 100 was made due to the timeout period having elapsed from the sending of the Keep Alive signal in S82 without any signal being received from the SP server 100, or not. In a case of determining that the determination was made due to the timeout period having elapsed (YES in S90), the CPU 32 proceeds to S92.

In S92, the CPU 32 determines the current waiting time as a new upper limit instead of the upper limit in the memory 34. Then, the CPU 32 stores the new upper limit in the memory 34. If the current waiting time is adopted again as the waiting time despite the failure of the communication confirmation having been caused by the lapse of the timeout period, the communication confirmation is highly likely to fail again due to the lapse of the timeout period. By determining the waiting time as the new upper limit in the case where the failure of the communication confirmation is caused by the lapse of the timeout period, the communication confirmation can be suppressed from failing again due to the lapse of the timeout period.

Next, in S94, the CPU 32 shortens the waiting time. Specifically, the CPU 32 determines a value that is obtained by subtracting a predetermined time (e.g., "0.5 minutes") from the current waiting time as a new waiting time instead of the current waiting time. When S94 is completed, the CPU 32 returns to S80 and attempts to establish an HTTP session again.

In a case of determining that the determination of S86 that a Keep Alive response is not received from the SP server 100 was made due to a signal different from a Keep Alive response having been received from the SP server 100 before the timeout period elapses (NO in S90), the CPU 32 skips the processes of S92 and S94 and returns to S80. The different signal as above is, for example, a signal indicating that the SP server 100 is incapable of sending a Keep Alive response due to maintenance and the like. Here, a comparative example is assumed in which the determination of S90 is not executed and the waiting time is shortened regardless of the cause of the failure of the communication confirmation, for example. In a case where the waiting time is shortened due to the timeout period having elapsed, this comparative example can suppress the failure of the communication confirmation due to the lapse of the timeout period by shortening the waiting time, however, in a case where the waiting time is shortened due to a cause other than the lapse of the timeout period, the comparative example unnecessarily shortens the waiting time although the cause cannot be resolved. Contrary to this, by executing the determination of S90, the waiting time can be suppressed from being unnecessarily shortened. As a result, the number of times the communication confirmation is executed within a predetermined period (e.g., one day) can be suppressed from unnecessarily increasing.

In a case of determining that a Keep Alive response is received from the SP server 100 (YES in S86), the CPU 32 proceeds to S100. In S100, the CPU 32 determines whether the Keep Alive response was received for the first time without the HTTP session established in S80 being disconnected after it was established. In a case of determining that the Keep Alive response was received for the first time (YES in S100), the CPU 32 proceeds to S110.

In S110, the CPU 32 extends the stored value. Specifically, the CPU 32 stores a value that is obtained by adding a predetermined time (e.g., "1 minute") to the current stored value as a new stored value in the memory 34 instead of the current stored value. By extending the stored value, the CPU 32 can determine the extended stored value as the waiting time in the process of S70 when the printer 10 is turned on again after the process of FIG. 6 has terminated due to the printer 10 having been turned off. That is, the CPU 32 extends the waiting time that is to be used when the printer 10 is turned on the next time. The stored value is never extended exceeding the upper limit in the memory 34.

In a case of determining that the Keep Alive response is received not for the first time (NO in S100) or when S110 is completed, the CPU 32 returns to S82 and restarts the communication confirmation. In case of NO in S100, the waiting time of the SP server 100 is not extended. That is, the waiting time determined in the Negotiation of S80 is maintained.

Figure 7:
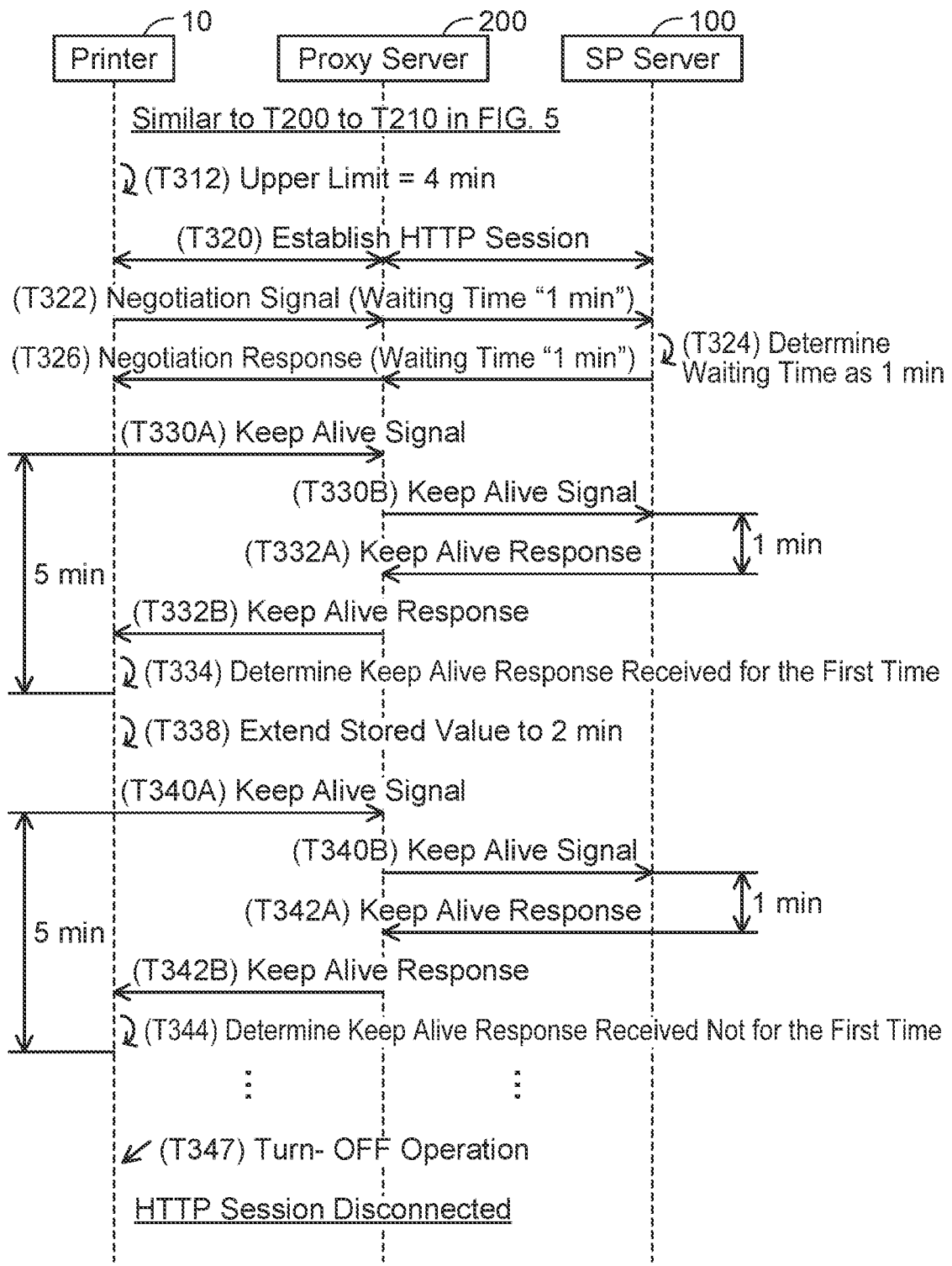
FIG. 7 shows Case B in which a proxy server is used.
Figure 8:
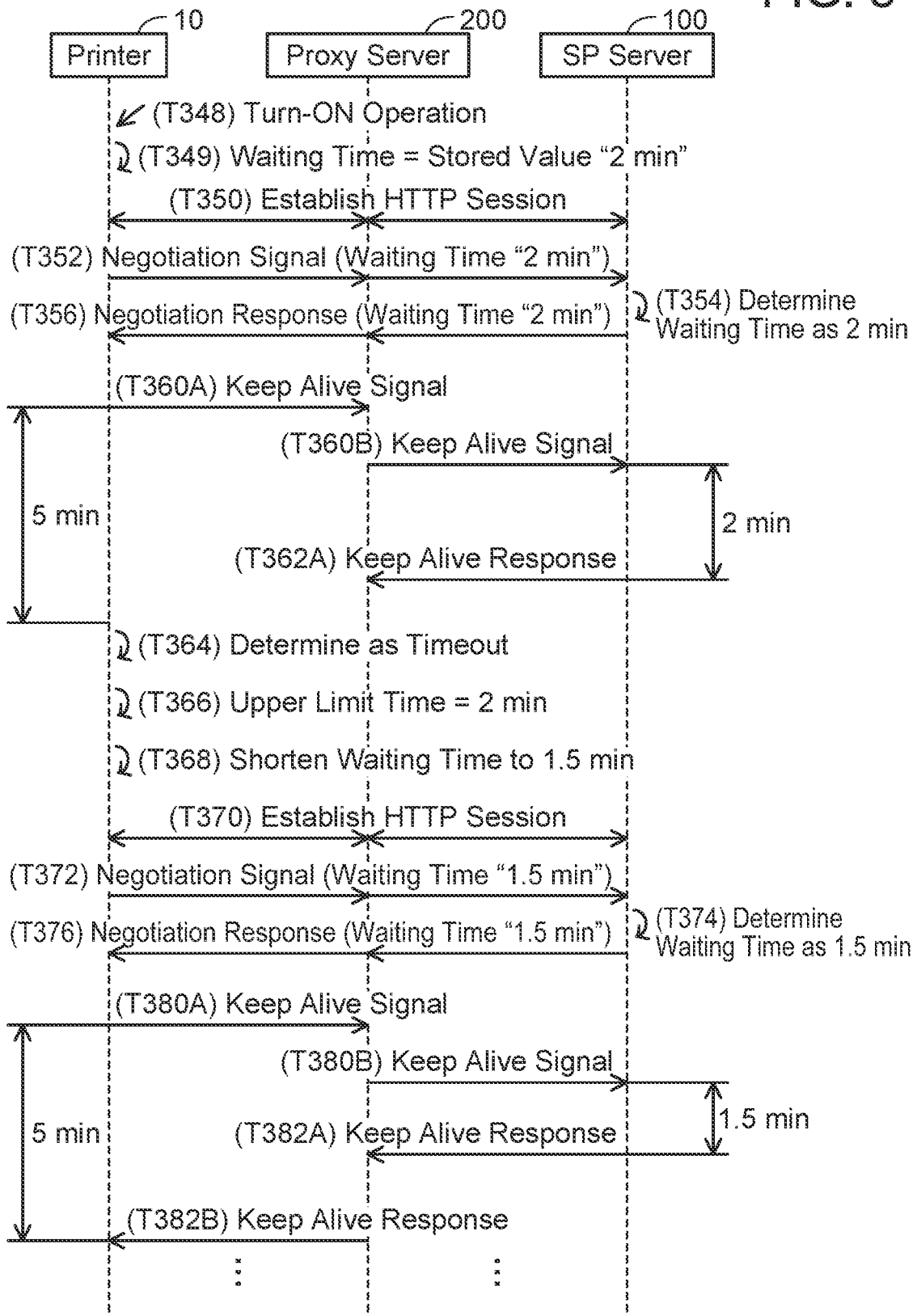
FIG. 8 shows a continuation of FIG. 7.

Case B in which Proxy Server is Used; FIGS. 7 and 8

A specific Case B realized by the process of FIG. 6 will be described with reference to FIGS. 7 and 8. In Case B, the proxy server is used. In the present case as well, processes similar to T200 to T210 of FIG. 5 are executed. In the course of the processes, the printer 10 stores the waiting time "1 minute", which is the first time, as a stored value. Then, in T312, the printer 10 determines the first value "4 minutes" as the upper limit (S63 of FIG. 6). Then, processes of T320 to T326, which are similar to T220 to T226 of FIG. 5, are executed, as a result of which an HTTP session is established with the SP server 100 and the waiting time of the SP server 100 is determined as "1 minute".

T330A to T332B are similar to T230A to T232B of FIG. 5. In T334, the printer 10 determines that the Keep Alive response was received for the first time without the HTTP session established in T320 being disconnected after it was established (YES in S100). In T338, the printer 10 extends the stored value from "1 minute" to "2 minutes" (S110).

T340A to T342B are similar to T330A to T332B of FIG. 7. That is, the waiting time of the SP server 100 is maintained at "1 minute". In T344, the printer 10 determines that the Keep Alive response was received not for the first time (NO in S100) and then repeats the communication confirmation.

In T347, the printer 10 accepts an operation of turning off the printer 10 from the user. As a result, the established HTTP session is disconnected.

Next, as shown in FIG. 8, the printer 10 accepts an operation of turning on the printer 10 from the user in T348. Then, in T349, the printer 10 determines the stored value of "2 minutes" as the waiting time (NO in S50 and S70 of FIG. 6). T350 to T356 are similar to T320 to T326 of FIG. 7 except that the waiting time is "2 minutes". That is, the SP server 100 determines the waiting time as "2 minutes".

T360A to T362A are similar to T330A to T332A of FIG. 7 except that the waiting time is "2 minutes". However, in the present case, due to the waiting time having been extended to "2 minutes", the timeout period of "5 minutes" elapses from the sending of the Keep Alive signal in T360A without a Keep Alive response being received from the SP server 100.

In T364, the printer 10 determines that a Keep Alive response is not received from the SP server 100 due to the timeout period having elapsed (NO in S86 and YES in S90 of FIG. 6). Then, in T366, the printer 10 determines the current waiting time of "2 minutes" as a new upper limit instead of the upper limit "4 minutes" in the memory 34 (S92).

In T368, the printer 10 shortens the waiting time from "2 minutes" to "1.5 minutes". T370 to T376 are similar to T350 to T356 except that the waiting time is "1.5 minutes". T380A to T382B are similar to T330A to T332B of FIG. 7 except that the waiting time is "1.5 minutes". That is, the communication confirmation succeeds.

Effects of Present Embodiment

According to the present embodiment, the printer 10 extends the waiting time (S110) in the case where the communication confirmation succeeds (YES in S86 of FIG. 6). Due to this, the number of times the communication confirmation is executed within a predetermined period (e.g., one day) can be reduced as compared to a comparative example in which the waiting time is not extended. Further, the printer 10 shortens the waiting time (S94) in the case where the communication confirmation fails (NO in S86). This can suppress the communication confirmation from failing again due to the lapse of the timeout period as compared to a comparative example in which the waiting time is not shortened.

Especially according to Case B, the printer 10 can determine the suitable waiting time of "1.5 minutes", which is longer than the predetermined waiting time of "1 minutes", considering that the communication confirmation is highly likely to fail due to the lapse of the timeout period with the waiting time of "2 minutes" (T368 of FIG. 8). As compared to the first embodiment in which the waiting time is maintained at the predetermined "1 minute" in the case where the proxy server 200 is used, the number of times the communication confirmation is executed within a predetermined period (e.g., one day) can be reduced.

(Corresponding Relationships)

The memory 34 of the printer 10 is an example of "memory". The timeout period "5 minutes" is an example of "predetermined time". The first value "4 minutes" in S63 and the second value "4.5 minutes" in S65 of FIG. 6 are respectively examples of "first value" and "second value".

(Variant 1) The "communication device" is not limited to the printer 10, but may be a scanner, a multi-function device, or a terminal device such as a PC.

(Variant 2) In each of the above embodiments, the printer 10 adjusts the waiting time to one of the first time and the second time (S22, S24 of FIG. 3) in the case where the proxy setting information 44 is changed (YES in S10 of FIG. 3). Instead of this, the printer 10 may not adjust the waiting time in the case where the proxy setting information 44 is changed. In the present variant, "in a case where the state of the communication device is changed from the second state to the first state and the session is established again, the controller adjusts the waiting time to the first time" and "in a case where the state of the communication device is changed from the first state to the second state and the session is established again, the controller adjusts the waiting time to the second time" may be omitted.

(Variant 3) In the second embodiment as above, the printer 10 can execute both extending of the waiting time (S110 of FIG. 6) and shortening of the waiting time (S94). Instead of this, the printer 10 may execute only one of extending of the waiting time and shortening of the waiting time.

(Variant 4) In the second embodiment as above, the determination of S90 in FIG. 6 may not be executed. Generally speaking, the waiting time may be shortened in both cases that a Keep Alive response is not received "due to a predetermined time having elapsed" and "due to a signal different from the response signal being received from the target server".

(Variant 5) In the second embodiment as above, the upper limit of the waiting time in the case where the proxy setting information 44 is "OFF" is longer than the upper limit of the waiting time in the case where the proxy setting information 44 is "ON" (S65 of FIG. 6). Instead of this, the upper limit of the waiting time in the case where the proxy setting information 44 is "OFF" may be equal to the upper limit of the waiting time in the case where the proxy setting information 44 is "ON". In this variant, the "second value" may be omitted.

(Variant 6) In the second embodiment as above, the process of S92 of FIG. 6 may not be executed. In the present variant, "store the waiting time that was used when the communication confirmation failed in a memory" may be omitted.

(Variant 7) The process of S110 of FIG. 6 (i.e., the process of extending the stored value) is an example of "extend the waiting time". Instead of this, in the case of determining YES in S100, the printer 10 may determine a value that is obtained by adding a predetermined time (e.g., "1 minute") to the current waiting time as a new waiting time instead of the current waiting time. That is, the printer 10 may extend the current waiting time. Further, the printer 10 may disconnect the HTTP session and establish an HTTP session again with the SP server 100 by using the connection information 42 in the memory 34. Then, the printer 10 may execute, with the SP server 100, Negotiation that includes instructing the SP server 100 to use the extended waiting time and may return to S82. In the present variant, extending the current waiting time is an example of "extend the waiting time".

(Variant 8) In the above embodiments, the respective processes of FIGS. 3 to 7 are realized by software (e.g., the program 40). Alternatively, one or more of the processes may be realized by hardware such as a logic circuit.

What is claimed is:

1. A communication device comprising:
a communication interface; and
a controller,
wherein the controller is configured to:
establish a session according to Hypertext Transfer Protocol (HTTP) with a target server on the Internet via the communication interface;
execute a communication confirmation repeatedly via the communication interface after the session has been established, the communication confirmation including that the communication device sends a confirmation signal to the target server and receives a response signal from the target server; and
adjust a waiting time, the waiting time being a time period from when the target server received the confirmation signal from the communication device to when the target server sends the response signal to the communication device,
in a case where a proxy server is used in communication between the communication device and the target server, the controller adjusts the waiting time by instructing the target server to use a first time as the waiting time, and
in a case where the proxy server is not used in communication between the communication device and the target server, the controller adjusts the waiting time by instructing the target server to use a second time as the waiting time, the second time being longer than the first time.

2. The communication device as in claim 1, wherein
a state of the communication device is changeable between a first state where the proxy server is used and a second state where the proxy server is not used,
in a case where the state of the communication device is changed after the session has been established, the session is disconnected,
after the session has been disconnected, the controller establishes the session according to HTTP with the target server again via the communication interface,
in a case where the state of the communication device is changed from the second state to the first state and the session is established again, the controller adjusts the waiting time to the first time, and
in a case where the state of the communication device is changed from the first state to the second state and the session is established again, the controller adjusts the waiting time to the second time.

3. The communication device as in claim 1, wherein
the controller is further configured to:
extend the waiting time in a case where the communication confirmation succeeds: and
shorten the waiting time in a case where the communication confirmation fails.

4. The communication device as in claim 3, wherein
the controller shortens the waiting time in a case where the communication confirmation fails due to a predetermined time having elapsed from when the confirmation signal was sent to the target server without the response signal being received from the target server, and
the controller does not shorten the waiting time in a case where the communication confirmation fails due to a signal different from the response signal being received from the target server before the predetermined time elapses from when the confirmation signal was sent to the target server.

5. The communication device as in claim 3, wherein
the controller extends the waiting time with a first value as an upper limit, in the case where the proxy server is used in communication between the communication device and the target server, and
the controller extends the waiting time with a second value as an upper limit, in the case where the proxy server is not used in communication between the communication device and the target server, the second value being larger than the first value.

6. The communication device as in claim 3, wherein
the controller is further configured to store the waiting time that was used when the communication confirmation failed in a memory, and
the controller extends the waiting time with the waiting time stored in the memory as an upper limit.

7. The communication device as in claim 1, wherein
the session is according to eXtensible Messaging and Presence Protocol over Bidirectional-streams Over Synchronous HTTP (XMPP over BOSH).

8. A non-transitory computer-readable medium storing computer-readable instructions for a communication device, wherein the computer-readable instructions, when executed by a processor of the communication device, cause the communication device to:
establish a session according to Hypertext Transfer Protocol (HTTP) with a target server on the Internet via a communication interface of the communication device;
execute a communication confirmation repeatedly via the communication interface after the session has been established, the communication confirmation including that the communication device sends a confirmation signal to the target server and receives a response signal from the target server; and
adjust a waiting time, the waiting time being a time period from when the target server received the confirmation signal from the communication device to when the target server sends the response signal to the communication device,
wherein in a case where a proxy server is used in communication between the communication device and the target server, the waiting time is adjusted by instructing the target server to use a first time as the waiting time, and
in a case where the proxy server is not used in communication between the communication device and the target server, the waiting time is adjusted by instructing the target server to use a second time as the waiting time, the second time being longer than the first time.

* * * * *